United States Patent [19]

DiMarchi et al.

[11] 4,169,378

[45] Oct. 2, 1979

[54] AQUARIUM THERMOMETER

[75] Inventors: Silvio J. DiMarchi, Wychoff, N.J.; Marvin A. Goldman, Great Neck, N.Y.; Arthur Gilmore, Greenlawn, N.Y.; Jerome N. Goldman, New York, N.Y.

[73] Assignee: Penn-Plax Plastics, Inc., Garden City, N.Y.

[21] Appl. No.: 916,524

[22] Filed: Jun. 19, 1978

[51] Int. Cl.² .............................................. G01K 1/14
[52] U.S. Cl. .................................. 73/353; 73/343 B; 73/376; 73/378
[58] Field of Search ............... 73/371, 374, 376, 377, 73/378, 353, 431, 343 R, 343 B; 335/285

[56] References Cited

U.S. PATENT DOCUMENTS

| | | | |
|---|---|---|---|
| 2,313,688 | 3/1943 | Wappner | 73/431 |
| 3,161,058 | 12/1964 | Willinger | 73/376 |

*Primary Examiner*—S. Clement Swisher
*Assistant Examiner*—Denis E. Corr
*Attorney, Agent, or Firm*—Mandeville and Schweitzer

[57] ABSTRACT

Disclosed herein is a modular aquarium apparatus generally comprising a watertight housing which suspends a glass thermometer safely therein. The housing includes a ballast chamber carrying a weight of predetermined characteristics sufficient to provide the housing with sufficient negative bouyancy such that the housing, without more, will float at the top of an aquarium with the lower portions of the housing submerged. With the addition of a special sinking sub-assembly carrying additional ballast the aforementioned thermometer housing may be converted into a sinkable housing for measuring temperatures at the bottom of the aquarium. Alternatively, the housing may be provided with a special cap and hanger arrangement for converting the housing into a hanging thermometer assembly adapted to be suspended from the upper wall portions of an aquarium tank.

10 Claims, 9 Drawing Figures

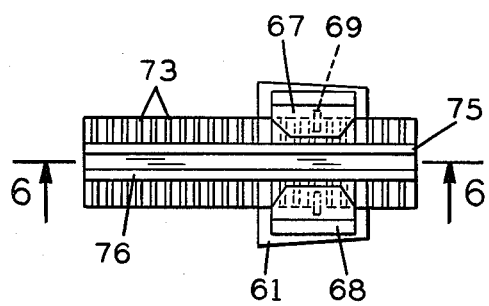
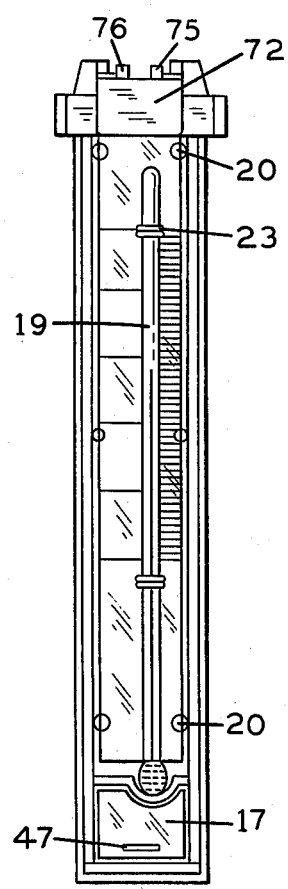
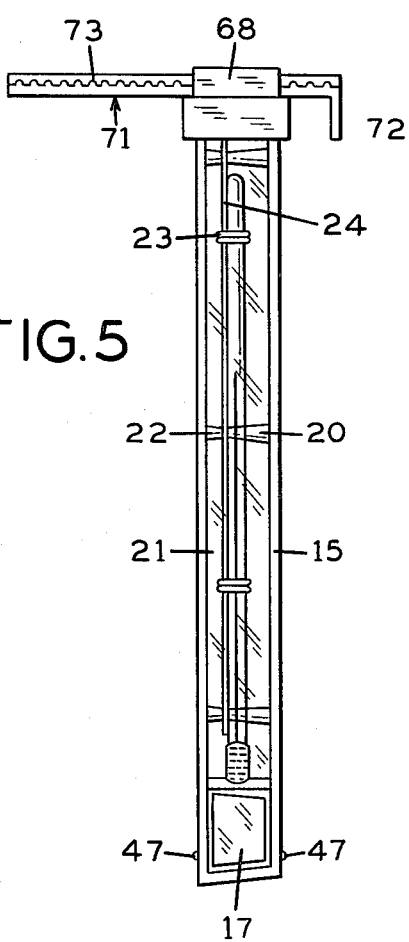
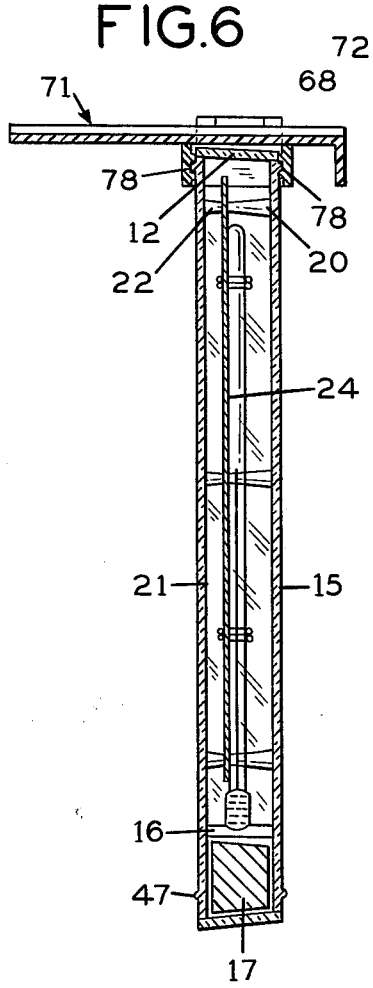
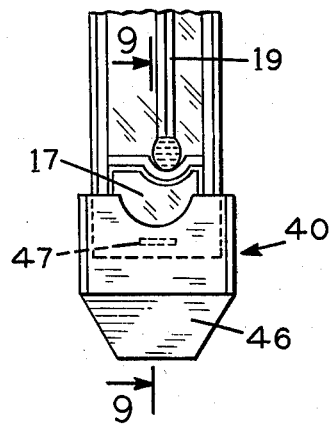
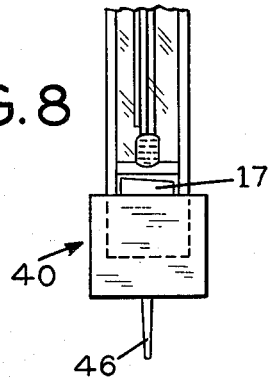
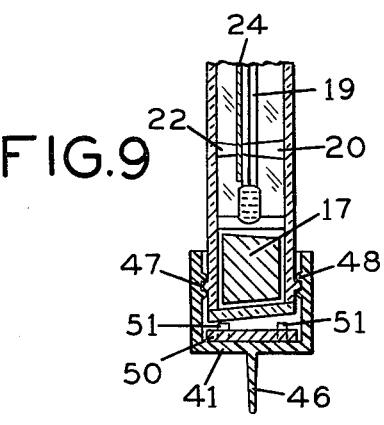

AQUARIUM THERMOMETER

BACKGROUND AND SUMMARY OF THE PRESENT INVENTION

The thermometer art in general is an old and crowded art, and the aquarium thermometer art in particular is similarly crowded, although not quite as old. A plethora of aquarium thermometer designs have been available to the hobbyist. These have fallen generally into several categories, namely, thermometers which may be hung from the top of an aquarium, thermometers which float on the surface or at the surface of a body of aquarium water, and thermometers which are fully submerged to the bottom and placed at the bottom of an aquarium.

The present invention provides a new and improved modular aquarium thermometer construction which lends itself to use in three different modes of operation, namely as a hanging aquarium thermometer, as a floating aquarium thermometer, or as a free-standing sinkable aquarium thermometer.

The new thermometer assembly generally includes an elongated transparent housing of non-toxic thermoplastic which carries therein in a shock-proof and safe fashion a glass thermometer secured to a readily readable thermometer scale. In accordance with the invention, the housing includes a separate ballast chamber at the lowermost portion thereof which carries a weight sufficient to submerge but not sink the thermometer when it is dropped into an aquarium. In accordance with the invention a sinking cap may be affixed to the lower end of the aquarium to totally submerge the thermometer to a free-standing position at the bottom of an aquarium tank. The sinking cap includes additional ballast and a stabilizing-anchoring fin which is adapted to guide the thermometer and to stabilize the thermometer in its descent through the aquarium water into the sand or gravel at the bottom of the aquarium. A still further embodiment of the invention utilizes a separate hanger cap which may be attached to the top of the thermometer housing for the purposes of securing the thermometer to the flange of an aquarium tank.

For a more complete understanding of the present invention and a better appreciation of its intended advantages reference should be made to the following detailed description of the invention taken in conjunction with the drawings herein.

DESCRIPTION OF THE DRAWINGS

FIG. 3 is a top plan view of the hanger cap assembly of the present invention;

FIG. 4 is a front elevational view of the aquarium thermometer of the present invention in its hanging mode;

FIG. 5 is a side elevational view of the thermometer of the present invention;

FIG. 6 is a cross-sectional view of the hanging thermometer taken along line 6—6 of FIG. 3;

FIG. 7 is a fragmentary front elevational view showing the sinking cap of the present invention;

FIG. 8 is a side elevational view of the cap shown in FIG. 7; and

FIG. 9 is a cross-sectional view of the cap assembly taken long line 9—9 of FIG. 7.

DETAILED DESCRIPTION OF THE PRESENT INVENTION

Figure 2:
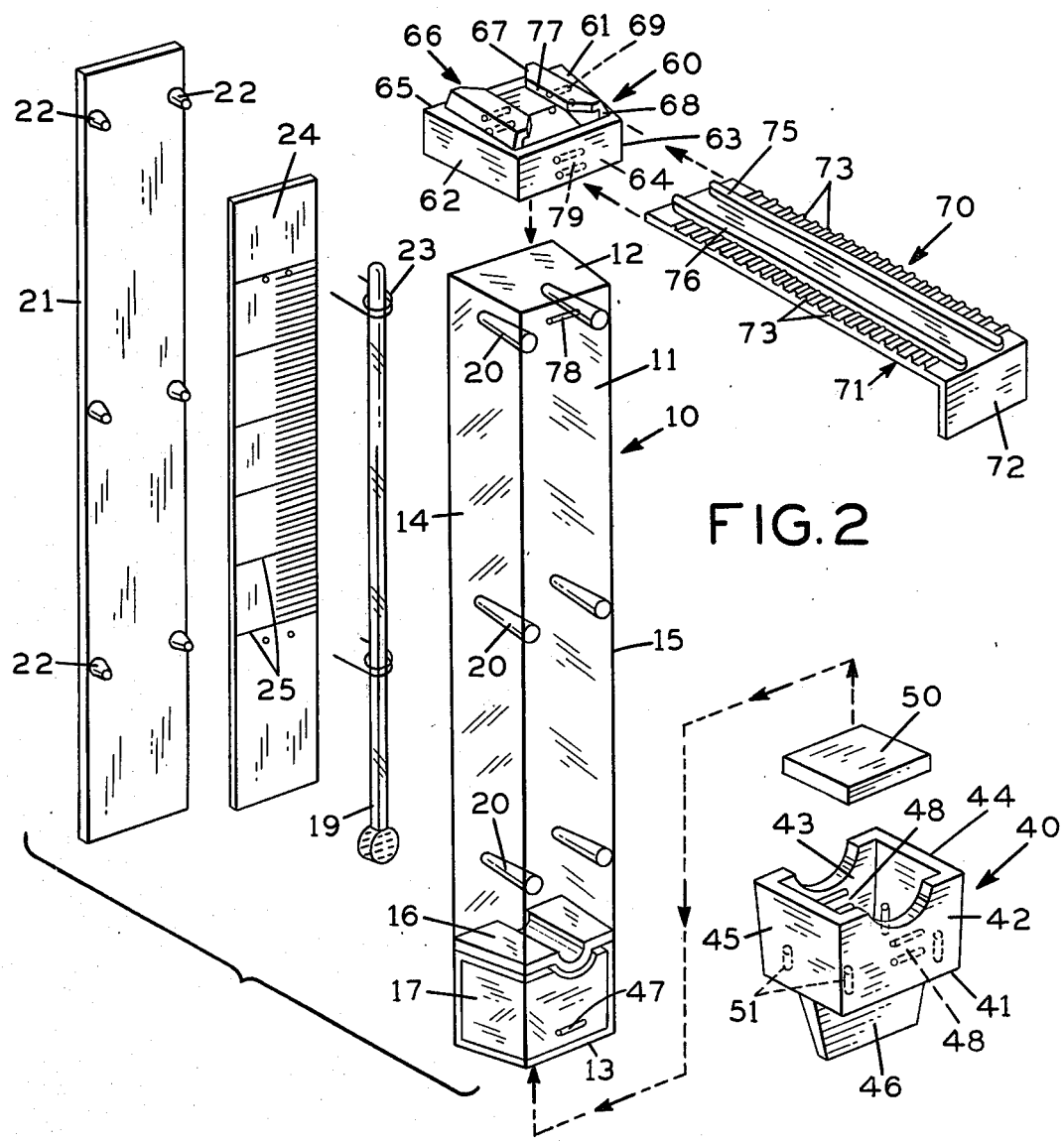
FIG. 2 is an exploded perspective view showing the components of the modular thermometer of the present invention and its hanging cap and sinking cap accessories for converting the thermometer from its floatable mode to either a hangable mode or a sinkable mode.

Referring now to FIG. 2 the modular thermometer assembly of the present invention generally includes a transparent elongated housing 10 having a front wall 11 and integral top and bottom walls 12, 13 extending rearwardly therefrom along with side walls 14 and 15. Spaced upwardly of the bottom wall 13 is a ballast chamber wall 16 which cooperates with the bottom wall 13 and the lower portions of the side walls 14 and 15 as well as the bottom portion of the front wall 11 to form a ballast chamber into which a ballast 17 is inserted. Advantageously the ballast wall 16 has a semicircular channel extending through center portions thereof to accomodate the bulb of the thermometer 19 as will be understood. Extending rearwardly from the front wall from the bottom wall 41 of the cap. The cap 40 may be force fit to the lower end of the housing 10; however is advantageously locked in place to the lower end of the housing by a pair of integral locking bars 47 formed on the front wall of the housing 10 and on the rear surface of the rear wall 21 as shown in FIG. 5. These locking bars 47 cooperate with similarly shaped locking grooves 48 formed on the inner wall surfaces of the cap walls 42, 43. Due to the resilience of the thermoplastic material from which the cap 40 is formed, it may be slid onto the lower end of the housing 10 and snapped into locking engagement therewith as will be understood.

Figure 1:
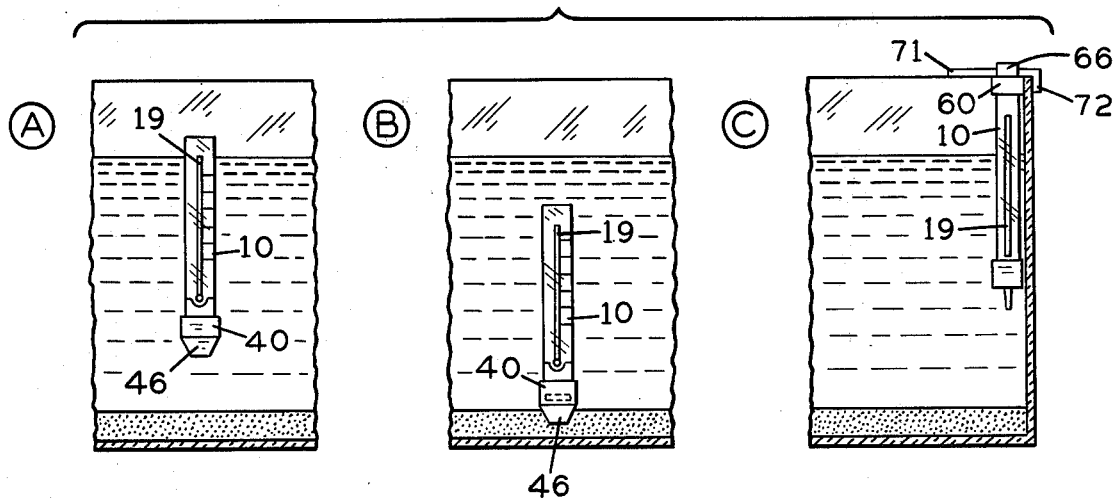
FIG. 1 is a schematic view of an aquarium tank showing the thermometer of the present invention disposed in said aquarium in its three modes, namely (a) as a floating thermometer, (b) as a free-standing sunken thermometer, and (c) as a hanging thermometer.

When the floating thermometer described hereinabove and illustrated in FIG. 1a is desired to be manufactured as a standing sinkable thermometer, the construction is essentially as that described hereinabove with a simple addition of an additional weight 50 which is inserted into the cap 40 before it is attached to the housing 10. Advantageously the weight 50 is locked into place within the cap 40 between four integral pins 51 which project upwardly from the bottom wall 41 of the cap 40.

The modular thermometer housing of the present invention may be used as a hanging thermometer in which mode the fin cap may, if desired, be omitted and in lieu thereof the hanger cap 60 is snapped onto the upper end of the modular housing. More specifically, the hanger cap 60 includes an upper wall 61 from which depend side hanger cap walls 62, 63 and front and rear hanger cap walls 64, 65, respectively. Projecting upwardly from the top cap wall 61 are a pair of brackets 66 each of which has a horizontal arm portion 67 and a vertical leg portion 68 as shown. On the underside of the horizontal arm portion 68 integral detent pins 69 are formed. 11 and along the side walls 14 and 15, are six integral supporting pins 20, the ends of which are short of the rearmost portions of the housing 10 as shown. A rear wall assembly 21 is provided and it includes forwardly projecting pins 22 which are spaced to register with the pins 20 when the rear wall 21 is sealed to the housing 10 to complete the assembly of the basic modular unit.

The glass thermometer 19 is secured by wire staples 23 to a planar thermometer scale 24 which includes horizontal graduations 25 formed thereon in the manner shown. The modular basic aquarium thermometer assembly is completed by placing the scale 24 carrying the thermometer 19 into the housing 19 and against the free edges of the pins 20. Thereafter, the rear wall 21 is placed over the open back of the housing, thereby firmly sandwiching the planar scale 24 in a shock-proof suspended relation between the pins 20 and 22 as will be understood and as is shown in FIG. 5. In accordance with the invention, the rear wall 21 is ultrasonically sealed to the housing 10 to enclose hermetically the thermometer 19 and scale 24.

As thusfar described, the modular aquarium thermometer is adapted to be dropped into an aquarium tank and to float vertically in the manner shown in FIG. 8. To enhance its vertical stability a fin cap 40 is attached to the lower end thereof. The fin cap 40 includes a bottom wall 41 and upstanding front and rear walls 42, 43 as well as upstanding side walls 44, 45. The cap 40 is generally trapezoidal in cross-sectional configuration and is conformed with the cross-sectional configuration of the housing. The stabilizing fin cap 40 includes a downwardly projecting tapered fin 46 which extends integrally Cooperating with the hanger cap 60 is a hanger arm 70 which includes an elongated tongue portion 71 from which depends a flange 72 adapted to engage the upper portion of the aquarium as will be understood. The tongue 71 includes a series of detents 73 at regularly spaced intervals, which detents 73 are adapted to cooperate with the detents 69 to lock the tongue in preselected positions in the cap 60; each position, of course, spacing the flange 72 a different distance from the front face 64 of the cap. In addition, the tongue 71 includes two stablizing bars 75, 76 which are adapted to engage the front edges 77 of the brackets 66 to stablize the tongue in its engagement in the cap 60.

In a manner similar to the attachment of the fin cap 40 to the lower end of the thermometer housing, the hanger cap 60 may be attached to the upper end of the thermometer housing by means of locking bars 78 formed adjacent the top wall 12 of the housing on the front wall 11 thereof and also formed on the outer rear surface of the rear wall 21 as shown in FIG. 6. Cooperating locking grooves 79 are formed on the inside surfaces of the hanger cap 60.

From the foregoing description it will be appreciated that a new improved modular aquarium thermometer assembly has been provided which assembly lends itself to use by a hobbyist in any one of three modes. The new assembly may be manufactured simply and efficiently by readily available mass production techniques. Moreover, by the simple expedient of adding either a stablizing cap or a hanger cap it may be converted from its basic floating mode to either a free-standing sunken mode of operation or a top-suspended hanging mode of operation.

While the aquarium thermometer constructions herein disclosed represent preferred embodiments, the present invention is not limited to those specific forms illustrated and described. Changes may be made therein without departing from the scope of this invention, as defined in the following claims.

We claim:

1. A modular aquarium thermometer assembly comprising:
   (a) a one-piece elongated, transparent, non-toxic housing having a front wall, side walls, and top and bottom walls;
   (b) integral first support pin means extending rearwardly along each of said side walls;
   (c) a one-piece rear wall having integral second support pin means extending forwardly along the side edges of said rear wall;
   (d) said first and second pins being in substantial registry;
   (e) an internal wall extending across said housing and cooperating with said bottom wall and lower portions of said side walls to define a ballast chamber;
   (f) first ballast means disposed in said ballast chamber and being of predetermined weight sufficient to submerge the lower end of the assembly in a body of water but of insufficient weight to sink said assembly in a body of water;
   (g) a planar scale member;
   (h) an elongated glass thermometer means secured to said scale member;
   (i) said scale member suspended in said assembly in a sandwiched relation between the opposite faces of said first and second pin means;
   (j) said housing being closed off in watertight manner by said rear wall.

2. The aquarium thermometer assembly of claim 1, in which
   (a) said rear wall is ultrasonically sealed to said housing.

3. The aquarium thermometer assembly of claim 1, in which
   (a) said scale member includes distinct horizontal graduations extending completely thereacross.

4. The aquarium thermometer assembly of claim 1, in which
   (a) said assembly is generally trapezoidal in cross-section.

5. The aquarium thermometer assembly of claim 1, which includes
   (a) a sinking sub-assembly means affixed to the bottom portion of said housing;
   (b) said sinking sub-assembly of non-toxic plastic having a bottom wall and four vertical walls, includes a hollow casing;
   (c) the inner surfaces of said vertical walls are configured to fit tightly about said ballast chamber;
   (d) second ballast means of predetermined weight, in combination with said first ballast means, to sink said housing and casing in a body of water.

6. The aquarium thermometer of claim 5, in which
   (a) said bottom wall of said sinking sub-assembly means includes an integral depending fin means.

7. The aquarium thermometer of claim 5, in which
   (a) integral ballast pin means extend upwardly from said bottom wall of said sinking sub-assembly casing;
   (b) said second ballast means is secured within said casing by said ballast pin means.

8. The aquarium thermometer of claim 1, which includes
   (a) hangar assembly affixed to the top portion of said housing;
   (b) said hangar assembly including a one-piece, non-toxic, cap having a top wall and depending side wall configured to fit tightly about the upper portions of said housing;

(c) a pair of spaced bracket means projecting from said cap top wall and having first detent means on inner surfaces thereof;

(d) a hangar arm slidable mounted to said cap by said bracket means and having second detent means on the upper surface thereof adapted to cooperate with said first detent means to lock said hangar arm in selected positions;

(e) said hangar arm including a vertical flange adapted to engage the outer surface of an aquarium tank; and (f) said hangar being of width substantially equal to the spacing of said bracket means.

9. The aquarium thermometer of claim 8, in which (a) said hangar arm includes elongated stablizing bar means;

(b) said bar means are disposed in confronting relation to the opposed edges of said bracket means.

10. The aquarium thermometer assembly of claim 1, in which (a) first locking means are integrally formed on the outer surfaces thereof adjacent one end of the housing;

(b) a cover means is disposed over said one end of the housing;

(c) said cover means includes second mating locking means adapted to cooperate with said first locking means.

* * * * *